(12) United States Patent
Grigsby et al.

(10) Patent No.: US 8,271,333 B1
(45) Date of Patent: Sep. 18, 2012

(54) CONTENT-RELATED WALLPAPER

(75) Inventors: David B. Grigsby, Encinitas, CA (US); Karen R. Rowlands, San Diego, CA (US)

(73) Assignee: Yahoo! Inc., Sunnyvale, CA (US)

(*) Notice: Subject to any disclaimer, the term of this patent is extended or adjusted under 35 U.S.C. 154(b) by 2592 days.

(21) Appl. No.: 10/004,278

(22) Filed: Oct. 30, 2001

Related U.S. Application Data

(63) Continuation-in-part of application No. 09/846,823, filed on Apr. 30, 2001.

(60) Provisional application No. 60/245,689, filed on Nov. 2, 2000.

(51) Int. Cl.
*G06Q 30/00* (2006.01)

(52) U.S. Cl. .................. 705/14.73; 705/14.4; 705/27.2

(58) Field of Classification Search .............. 705/14.4, 705/17.73
See application file for complete search history.

(56) References Cited

U.S. PATENT DOCUMENTS

| | | |
|---|---|---|
| 3,568,156 A | 3/1971 | Thompson |
| 4,384,329 A | 5/1983 | Rosenbaum |
| 4,833,610 A | 5/1989 | Zamora |
| 5,062,143 A | 10/1991 | Schmitt |
| 5,182,708 A | 1/1993 | Ejiri |
| 5,241,674 A | 8/1993 | Kuorsawa |
| 5,303,150 A | 4/1994 | Komeda |
| 5,303,302 A | 4/1994 | Burrows |
| 5,371,807 A | 12/1994 | Register |
| 5,392,212 A | 2/1995 | Geist |
| 5,404,505 A | 4/1995 | Levinson |
| 5,418,951 A | 5/1995 | Damashek |
| 5,497,488 A | 3/1996 | Akizawa |
| 5,499,046 A | 3/1996 | Schiller et al. |
| 5,539,635 A | 7/1996 | Larson, Jr. |
| 5,548,507 A | 8/1996 | Martino |
| 5,559,868 A * | 9/1996 | Blonder ................. 379/93.23 |
| 5,583,763 A | 12/1996 | Atcheson |
| 5,592,511 A | 1/1997 | Schoen |
| 5,608,622 A | 3/1997 | Church |

(Continued)

FOREIGN PATENT DOCUMENTS

AU     A53031/98     2/1997

(Continued)

OTHER PUBLICATIONS

Hayes, Conor et al., Smart Radio—A Proposal, Technical Report TCD-CS-1999-24, Online! Apr. 1999, pp. 1-14, XP002279579, Trinity College Dublin, Ireland, Retrieved from the Internet: <URL:http://www.cs.tcd.ie/publications/tech-reports/reports.99/TCD-CS-1999-24.pdf>, retrieved on May 7, 2004.

(Continued)

*Primary Examiner* — Yehdega Retta
(74) *Attorney, Agent, or Firm* — James J. DeCarlo; Greenberg Traurig, LLP

(57) ABSTRACT

A media player provides on-screen desktop imagery such as background wallpaper and/or interactive features, related to music or other content being played. The presentation of the content-related imagery and/or features is not limited to the area of the screen associated with the media player, but can extend to other areas of the screen as well. The content-related imagery and/or features may be displayed, for example, as desktop wallpaper, so that it appears as a background to other user interface elements such as icons and windows.

95 Claims, 11 Drawing Sheets

U.S. PATENT DOCUMENTS

| | | |
|---|---|---|
| 5,616,876 A | 4/1997 | Cluts |
| 5,661,787 A | 8/1997 | Pocock |
| 5,675,786 A | 10/1997 | McKed |
| 5,678,054 A | 10/1997 | Shibata |
| 5,680,535 A * | 10/1997 | Harbin et al. ............ 345/473 |
| 5,706,365 A | 1/1998 | Rangarajan |
| 5,708,709 A | 1/1998 | Rose |
| 5,713,016 A | 1/1998 | Hill |
| 5,721,827 A | 2/1998 | Logan |
| 5,726,909 A | 3/1998 | Krikorian |
| 5,740,134 A | 4/1998 | Peterson |
| 5,751,672 A | 5/1998 | Yankowsky |
| 5,754,938 A | 5/1998 | Herz |
| 5,758,257 A | 5/1998 | Herz |
| 5,764,235 A | 6/1998 | Hunt |
| 5,774,357 A | 6/1998 | Hoffberg |
| 5,790,423 A | 8/1998 | Lan et al. |
| 5,790,935 A | 8/1998 | Payton |
| 5,809,246 A | 9/1998 | Goldman |
| 5,819,160 A | 10/1998 | Foladare |
| 5,819,284 A * | 10/1998 | Farber et al. ............ 709/203 |
| 5,842,010 A | 11/1998 | Jain |
| 5,862,220 A | 1/1999 | Perlman |
| 5,862,339 A | 1/1999 | Bonnaure |
| 5,864,868 A | 1/1999 | Contois |
| 5,872,921 A | 2/1999 | Zahariev |
| 5,881,234 A | 3/1999 | Schwab |
| 5,883,986 A | 3/1999 | Kopec |
| 5,884,312 A | 3/1999 | Dustan |
| 5,898,833 A | 4/1999 | Kidder |
| 5,913,040 A | 6/1999 | Rakavy |
| 5,913,041 A | 6/1999 | Ramanathan |
| 5,926,207 A | 7/1999 | Vaughan |
| 5,930,526 A | 7/1999 | Iverson |
| 5,930,768 A | 7/1999 | Hooban |
| 5,931,907 A | 8/1999 | Davies |
| 5,941,951 A | 8/1999 | Day |
| 5,945,988 A | 8/1999 | Williams |
| 5,950,189 A | 9/1999 | Cohen |
| 5,956,482 A | 9/1999 | Agraharam |
| 5,959,624 A * | 9/1999 | Johnston et al. .......... 715/746 |
| 5,960,430 A | 9/1999 | Haimowitz |
| 5,969,283 A | 10/1999 | Looney |
| 5,977,964 A | 11/1999 | Williams |
| 5,983,176 A | 11/1999 | Hoffert |
| 5,987,525 A | 11/1999 | Roberts |
| 5,996,007 A * | 11/1999 | Klug et al. ............ 709/218 |
| 5,996,015 A | 11/1999 | Day |
| 6,000,008 A | 12/1999 | Simcoe |
| 6,009,382 A | 12/1999 | Martino |
| 6,012,098 A | 1/2000 | Bayeh |
| 6,020,883 A | 2/2000 | Herz |
| 6,021,203 A | 2/2000 | Douceur |
| 6,026,398 A | 2/2000 | Brown et al. |
| 6,026,439 A | 2/2000 | Chowdhury |
| 6,029,195 A | 2/2000 | Herz |
| 6,031,795 A | 2/2000 | Wehmeyer |
| 6,031,797 A | 2/2000 | Van Ryzin |
| 6,035,268 A | 3/2000 | Carus |
| 6,038,527 A | 3/2000 | Renz |
| 6,038,591 A | 3/2000 | Wolfe |
| 6,047,251 A | 4/2000 | Pon |
| 6,047,268 A | 4/2000 | Bartoli |
| 6,047,320 A | 4/2000 | Tezuka |
| 6,047,327 A | 4/2000 | Tso |
| 6,052,717 A | 4/2000 | Reynolds |
| 6,061,680 A | 5/2000 | Scherf |
| 6,064,980 A | 5/2000 | Jacobi |
| 6,065,051 A | 5/2000 | Steele |
| 6,065,058 A | 5/2000 | Hailpern |
| 6,070,185 A | 5/2000 | Anupam |
| 6,085,242 A | 7/2000 | Chandra |
| 6,097,719 A | 8/2000 | Benash |
| 6,102,406 A | 8/2000 | Miles |
| 6,105,022 A | 8/2000 | Takahashi |
| 6,131,082 A | 10/2000 | Hargrave |
| 6,134,532 A | 10/2000 | Lazarus |
| 6,138,142 A | 10/2000 | Linsk |
| 6,154,773 A | 11/2000 | Roberts |
| 6,161,132 A | 12/2000 | Roberts |
| 6,161,139 A | 12/2000 | Win et al. |
| 6,167,369 A | 12/2000 | Schulze |
| 6,182,142 B1 | 1/2001 | Win |
| 6,185,560 B1 | 2/2001 | Young |
| 6,192,340 B1 | 2/2001 | Abecassis |
| 6,205,126 B1 | 3/2001 | Moon |
| 6,222,980 B1 | 4/2001 | Asai |
| 6,225,546 B1 | 5/2001 | Kraft |
| 6,230,192 B1 | 5/2001 | Roberts |
| 6,230,207 B1 | 5/2001 | Roberts |
| 6,240,459 B1 | 5/2001 | Roberts |
| 6,246,672 B1 | 6/2001 | Lumelsky |
| 6,249,810 B1 | 6/2001 | Kiraly |
| 6,252,988 B1 | 6/2001 | Ho |
| 6,263,313 B1 | 7/2001 | Milsted |
| 6,272,456 B1 | 8/2001 | de Campos |
| 6,272,495 B1 | 8/2001 | Hetherington |
| 6,282,548 B1 | 8/2001 | Burner |
| 6,292,795 B1 | 9/2001 | Peters et al. |
| 6,298,446 B1 | 10/2001 | Schreiber |
| 6,314,421 B1 | 11/2001 | Sharnoff |
| 6,317,761 B1 | 11/2001 | Landsman |
| 6,321,205 B1 | 11/2001 | Eder |
| 6,321,221 B1 | 11/2001 | Bieganski |
| 6,330,593 B1 | 12/2001 | Roberts |
| 6,343,317 B1 | 1/2002 | Glorikian |
| 6,353,849 B1 | 3/2002 | Linsk |
| 6,370,315 B1 | 4/2002 | Mizuno |
| 6,370,513 B1 | 4/2002 | Kolawa |
| 6,389,467 B1 | 5/2002 | Eyal |
| 6,405,203 B1 | 6/2002 | Collart |
| 6,430,539 B1 | 8/2002 | Lazarus |
| 6,434,535 B1 | 8/2002 | Kupka |
| 6,438,579 B1 | 8/2002 | Hosken |
| 6,487,598 B1 | 11/2002 | Valencia |
| 6,490,553 B2 | 12/2002 | Van Thong |
| 6,505,160 B1 * | 1/2003 | Levy et al. ............ 704/270 |
| 6,505,203 B1 | 1/2003 | Levy |
| 6,512,763 B1 | 1/2003 | DeGolia, Jr. |
| 6,513,061 B1 | 1/2003 | Ebata |
| 6,522,769 B1 | 2/2003 | Rhoads |
| 6,526,411 B1 | 2/2003 | Ward |
| 6,532,477 B1 | 3/2003 | Tang |
| 6,535,854 B2 | 3/2003 | Buchner |
| 6,538,996 B1 | 3/2003 | West |
| 6,557,026 B1 | 4/2003 | Stephens, Jr. |
| 6,560,403 B1 | 5/2003 | Tanaka |
| 6,560,704 B2 | 5/2003 | Dieterman |
| 6,587,127 B1 * | 7/2003 | Leeke et al. ............ 715/765 |
| 6,611,812 B2 | 8/2003 | Hurtado |
| 6,611,813 B1 | 8/2003 | Bratton |
| 6,614,914 B1 | 9/2003 | Rhoads |
| 6,615,208 B1 | 9/2003 | Behrens |
| 6,655,963 B1 | 12/2003 | Horvitz |
| 6,657,117 B2 | 12/2003 | Weare |
| 6,658,151 B2 | 12/2003 | Lee |
| 6,661,787 B1 | 12/2003 | O'Connell |
| 6,677,894 B2 | 1/2004 | Sheynblat |
| 6,725,446 B1 | 4/2004 | Hahn |
| 6,741,980 B1 | 5/2004 | Langseth |
| 6,757,740 B1 | 6/2004 | Parekh |
| 6,760,721 B1 * | 7/2004 | Chasen et al. ............ 707/3 |
| 6,807,632 B1 | 10/2004 | Carpentier |
| 6,889,383 B1 | 5/2005 | Jarman |
| 6,925,441 B1 | 8/2005 | Jones, III |
| 6,952,523 B2 | 10/2005 | Tanaka |
| 6,957,398 B1 * | 10/2005 | Nayeri ............ 715/867 |
| 2001/0005823 A1 | 6/2001 | Fischer |
| 2001/0042107 A1 | 11/2001 | Palm |
| 2001/0042109 A1 | 11/2001 | Bolas |
| 2001/0044855 A1 | 11/2001 | Vermeire |
| 2001/0052028 A1 | 12/2001 | Roberts |
| 2001/0055276 A1 | 12/2001 | Rogers |
| 2002/0002039 A1 | 1/2002 | Qureshey |
| 2002/0004839 A1 | 1/2002 | Wine |
| 2002/0007418 A1 | 1/2002 | Hegde |
| 2002/0010621 A1 | 1/2002 | Bell |

| | | | |
|---|---|---|---|
| 2002/0010714 | A1 | 1/2002 | Hetherington |
| 2002/0010789 | A1 | 1/2002 | Lord |
| 2002/0013852 | A1 | 1/2002 | Janik |
| 2002/0016839 | A1 | 2/2002 | Smith |
| 2002/0035561 | A1 | 3/2002 | Archer |
| 2002/0045717 | A1 | 4/2002 | Grenda |
| 2002/0056004 | A1 | 5/2002 | Smith |
| 2002/0065857 | A1 | 5/2002 | Michalewicz |
| 2002/0082901 | A1* | 6/2002 | Dunning et al. ............... 705/10 |
| 2002/0095387 | A1 | 7/2002 | Sosa |
| 2002/0099696 | A1 | 7/2002 | Prince |
| 2002/0099737 | A1 | 7/2002 | Porter |
| 2002/0111912 | A1 | 8/2002 | Hunter |
| 2002/0129123 | A1 | 9/2002 | Johnson |
| 2002/0152204 | A1 | 10/2002 | Ortega |
| 2002/0175941 | A1 | 11/2002 | Hand |
| 2002/0184180 | A1* | 12/2002 | Debique et al. ................ 707/1 |
| 2003/0002608 | A1 | 1/2003 | Glenn |
| 2003/0007507 | A1 | 1/2003 | Rajwan et al. |
| 2003/0028796 | A1 | 2/2003 | Roberts |
| 2003/0046283 | A1 | 3/2003 | Roberts |
| 2003/0083871 | A1 | 5/2003 | Foote |
| 2003/0093476 | A1 | 5/2003 | Syed |
| 2003/0133453 | A1 | 7/2003 | Makishima |
| 2003/0135513 | A1 | 7/2003 | Quinn |
| 2003/0139989 | A1 | 7/2003 | Churquina |
| 2003/0165200 | A1 | 9/2003 | Pugel |
| 2003/0182139 | A1 | 9/2003 | Harris |
| 2003/0190077 | A1 | 10/2003 | Ross |
| 2003/0206558 | A1 | 11/2003 | Parkkinen |
| 2005/0149759 | A1 | 7/2005 | Vishwanath |

FOREIGN PATENT DOCUMENTS

| | | |
|---|---|---|
| EP | 01/73639 | 5/1986 |
| EP | 0 847 156 A2 | 9/1997 |
| EP | 1010098 B1 | 4/1998 |
| EP | 1324567 A2 | 4/1998 |
| EP | 0955592 A2 | 4/1999 |
| EP | 1 050 833 A2 | 8/2000 |
| EP | 1236354 | 9/2002 |
| GB | 2306869 | 11/1995 |
| JP | 2001202368 | 7/2001 |
| JP | 2001521642 | 11/2001 |
| WO | WO 97/07467 | 2/1997 |
| WO | WO 98/25269 | 6/1998 |
| WO | WO 98/47080 | 10/1998 |
| WO | WO 99/27681 | 6/1999 |
| WO | WO 99/43111 | 8/1999 |
| WO | WO 00/46681 A1 | 2/2000 |
| WO | WO 00/31964 | 6/2000 |
| WO | WO 01/33379 A1 | 10/2000 |
| WO | WO 01/35667 A1 | 11/2000 |
| WO | WO 01/54323 A2 | 1/2001 |
| WO | WO 01/73639 A1 | 10/2001 |
| WO | WO 02/42862 A2 | 5/2002 |
| WO | WO 02/65341 A2 | 8/2002 |
| WO | WO 02/65341 A3 | 8/2002 |
| WO | WO 03/012695 A2 | 2/2003 |

OTHER PUBLICATIONS

Hoffman, Thomas et al., Latent Class Models for Collaborative Filtering, Proceedings of the Sixteenth International Joint Conference on Artificial Intelligence, IJCAI 99, Stockholm, Sweden. Jul. 31-Aug. 6, 1999, Online! pp. 688-693, XP002279578, Retrieved from the Internet: <URL:http://www.cs.brown.edu/{th/papers/HofmannPuzicha-IJCAI99.pdf>, retrieved on May 7, 2004.
Loeb, Shoshana, Architecting Personalized Delivery of Multimedia Information, Communications of the ACM, vol. 25. No. 12, Dec. 1992, pp. 39-50, XP002102709.
Nichols, David M. et al., Recommendation and Usage in the Digital Library. Technical Report Ref. CSEG/2/1997, Online! 1997, pp. 1-15, XP002279577, Retrieved from the Internet: <URL:ftp://ftp.comp.lancs.ac.uk/pub/reports/1997/CSEG.2.97.pdf>, retrieved on May 7, 2004.
Schafer, J. Ben et al., Recommender Systems in E-Commerce, Proceedings ACM Conference on Electronic Commerce, 1999, pp. 158-166, XP002199598.

U.S. Appl. No. 60/144,377, filed Jul. 16, 1999, Benjamin E. Hosken.
U.S. Appl. No. 60/165,726, filed Nov. 15, 1999, Sean Michnel Ward.
U.S. Appl. No. 60/165,727, filed Nov. 15, 1999, Sean Michnel Ward.
U.S. Appl. No. 60/166,039, filed Nov. 17, 1999, Sean Michnel Ward.
Adam B. Stubblefield, et al., "A Security Analysis of MY.PP3.com and the Beam-it Protocol".
Alan Griffiths, H. Claire Luckhurst and Peter Willett, "Using Interdocument Similarity Information in Document Retrieval Systems," pp. 365-373, John Wiley & Sons, Inc., 1986.
Brian P. McCune, Richard M. Tong, Jeffrey S. Dean, and Daniel G. Shapiro, "RUBRIC: A System for Rule-Based Information Retrieval," pp. 440-445.
C. J. van Rijsbergen, B.Sc., Ph.D., M.B.C.S, "Information Retrieval," Department of Computing Science—University of Glasgow [online], 1979 [retrieved on Aug. 24, 2001]. Retrieved from <URL:http://www.dcs.gla.ac.uk/keith/preface.html> (213 pages).
Carl de Marcken, "The Unsupervised Acquisition of a Lexicon from Continuous Speech," Massachusetts Institute of Technology Artificial Intelligence Laboratory: Center for Biological and Computational Learning, Department of Brain and Cognitive Sciences, A.I. Memo No. 1558 and C.B.C.L. Memo No. 129, Nov. 2001, pp. 1-27.
Charu C. Aggarwal, Cecilia Procopiuc, Joel L. Wolf, Philip S. Yu, and Jong Soo Park, "Fast Algorithm for Projected Clustering;", Proceedings of the ACM SIGMOD International Conference on Management of Data, 1999.
Cyril Cleverdon, "The Cranfield Tests on Index Language Devices," presented Apr. 27, 1967, pp. 47-59, Found in: Readings in Information Retrieval, Edited by Karen Sparck Jones and Peter Willett, Morgan Kaufmann Publishers, Inc., San Francisco, CA, 1997.
Cyril W. Cleverdon and J, Mills, "The Testing of Index Language Devices," presented Feb. 5, 1963, Chapter 3—Key Concepts, pp. 98-110, Found in: Readings in Information Retrieval, Edited by Karen Sparck Jones and Peter Willett, Morgan Kaufmann Publishers, Inc., San Francisco, CA, 1997.
David A. Hull and Gregory Grefenstette, "Querying Across Languages: A Dictionary-Based Approach to Multilingual Information Retrieval," pp. 484-492.
E. Michael Keen, "Presenting Results of Experimental Retrieval Comparisons," Department of Information & Library Studies, University College of Wales, Aberystwyth, Sy23 3AS U.K., pp. 217-222.
Erling Wold, Thom Blum, Douglas Keislar, and James Wheaton, "Content-Based Classification, Search, and Retrieval of Audio," IEEE MultiMedia, Fall 1996.
F.W. Lancaster, "MEDLARS: Report on the Evaluation of Its Operating Efficiency," pp. 223-246.
Gerard Salton and C. Buckley, "Term-Weighting Approaches in Automatic Text Retrieval," (received Nov. 19, 1987; accepted in final form Jan. 26, 1988), Department of Computer Science, Cornell University, Ithaca, NY.
Gerard Salton and M. E. Lesk, "Computer Evaluation of Indexing and Text Processing," pp. 60-84, Found in: Readings in Information Retrieval, Edited by Karen Sparck Jones and Peter Willett, Morgan Kaufmann Publishers, Inc ., San Francisco, CA, 1997.
Gerard Salton and M.J. McGill, "The SMART and SIRE Experimental Retrieval Systems," pp. 381-399.
Gerard Salton and Michael J. McGill, "Introduction to Modem Information Retrieval," Computer Science Series, pp. 1-435, 1983 by McGraw-Hill, Inc., McGraw-Hill Book Company, USA.
Gerard Salton, A. Wong and C.S. Yang, "A Vector Space Model for Automatic Indexing," Cornell University, pp. 273-280.
Gerard Salton, James Man, Chris Buckley and Amit Singhal, "Automatic Analysis, Theme Generation, and Summarization of Machine-Readable Texts," pp. 478-483.
Ian Goldberg, Steven D. Gribble, David Wagner, Eric A. Brewer "The Ninja Jukebox" Oct. 14, 1999.
Ian H. Witten and Eibe Frank, "Data Mining, Practical Machine Learning Tools and Techniques with JAVA Implementations", Academic Press, pp. 57-76.
Internet Papers: Freetantrum: Songprint 1.2, and computer code; www.freetantrum.org.
Jean Tague-Sutcliffe, "The Pragmatics of Information Retrieval Experimentation Revisited," School of Library and Information Science, University of Western Ontario, Canada, pp. 205-216.

Karen Sparck Jones and Peter Willett (Editors),Chapter 3—"Key Concepts," pp. 85-92. Found in: Readings in Information Retrieval, Morgan Kaufmann Publishers, Inc ., San Francisco, CA, 1997.

Karen Sparck Jones, G.J.F. Jones, J.T. Foote, and S.J. Young, "Experiments in Spoken Document Retrieval," pp. 493-502.

Karen Sparck Jones, "Search Term Relevance Weighting Given Little Relevance Information," pp. 329-338, (originally located in Journal of Documentation, vol. 35, No. 1; Mar. 1979, pp. 30-48).

Lauren B. Doyle, "Indexing and Abstracting by Association—Part 1," pp. 25-38, Santa Monica, CA, Found in: Readings in Information Retrieval, Edited by Karen Sparck Jones and Peter Willett, Morgan Kaufmann Publishers, Inc., San Francisco, CA, 1997.

Lisa F. Rau, "Conceptual Information Extraction and Retrieval from Natural Language Input," Artificial Intelligence Program GE Research and Development Center, Schenectady, NY 12301, pp. 527-533.

M. Agosti, G. Gradenigo, P.G. Marchetti, "A Hypertext Environment for Interacting with Large Textual Databases," pp. 469-477.

M. F. Porter, "An Algorithm for Suffix Stripping," Computer Laboratory, Com Exchange Street, Cambridge, 313-316.

M.E. Maron and J.L. Kuhns, "On Relevance, Probabilistic Indexing and Information Retrieval," pp. 39-46, Found in: Readings in Information Retrieval, Edited by Karen Sparck Jones and Peter Willett, Morgan Kaufmann Publishers, Inc ., San Francisco, CA, 1997.

MusicMatch Literature downloaded from web.archive.org—7 pages total.

N.J. Belkin, R.N. Oddy, H.M. Brooks, "The Journal of Documentation", pp. 299-304, vol. 38, No. 2, Jun. 1982.

R. Brody, Ph.D., "The Conditions and Consequences of Profiling in Commercial and Governmental Settings," Technology and Society, 1998. ISTAS 98. Wiring the World: The Impact of Information Technology on Society, Proceedings of the 1998 International Symposium on South Bend, IN, USA Jun. 12-13, 1998, NY, NY, USA, IEEE, US, Jun. 12, 1998 , pp. 148-154, XP010291443, ISBN: 0-7803-4327-1 *the whole document*.

S.E Robertson, "The Probability Ranking Principle in IR," School of Library, Archive, Information Studies, University College of London, pp. 281-286.

S.E. Robertson and S. Walker, "Some Simple Effective Approximations to the 2—Poisson Model for Probabilistic Weighted Retrieval," Centre for Interactive Systems Research, Department of Information Science, City University, Northampton Square, London, ECIV OHB, U.K., pp. 345-354.

Tej Shah, "Improving Electronic Commerce Through Gathering Customer Data", TCC402 [online] Apr. 23, 1998 XP002379874, University of Virginia, USA, Retrieved from the Internet: <URL:http://www.lib.virginia.edu> [Retrieved on May 8, 2006] *the whole document*.

Tomek Strzalkowski, "Robust Text Processing in Automated Information Retrieval," Courant Institute of Mathematical Sciences, pp. 317-322.

Unjung Nam, Lectures: "Mel-Frequency Cepstral Analysis," [online] [retrieved on Feb. 2, 2001] Retrieved from the Internet <URL:http://www.ccrma.standford.edu/~unjung/mylec/mfcc.html>, pp. 1-3.

W. B. Croft and D. J. Harper, "Using Probabilistic Models of Document Retrieval Without Relevance Information," Department of Computer & Information Science, University of Massachusetts, pp. 339-344.

W. J. Hutchins, "The Concept of 'Aboutness' in Subject Indexing," presented Apr. 18, 1977, Chapter 3—Key Concepts, pp. 93-97, Found in: Readings in Information Retrieval, Edited by Karen Sparck Jones and Peter Willett, Morgan Kaufmann Publishers, Inc ., San Francisco, CA, 1997.

Z. Liu, et al., "Audio Feature Extraction and Analysis for Scene Segmentation and Classification".

* cited by examiner

CONTENT-RELATED WALLPAPER

CROSS-REFERENCE TO RELATED APPLICATIONS

The present application claims priority from provisional U.S. Patent Application Ser. No. 60/245,689 for "Content-Related Wallpaper," filed Nov. 2, 2000, the disclosure of which is incorporated herein by reference. The disclosure of U.S. patent application Ser. No. 09/846,823 for "Relationship Discovery Engine," filed Apr. 30, 2001, is incorporated herein by reference.

BACKGROUND OF THE INVENTION

1. Field of the Invention

The present invention is related to a user interface for computer-based playback of content such as music, and more particularly to presenting +wallpaper or other background imagery related to the content.

2. Description of the Background Art

Many users are now using their computers to listen to music. Most personal computers are now equipped with CD-ROM drives and/or DVD-ROM drives, as well as sound cards and speakers, and further include music player software for playing audio. Typically such software includes a user interface that allows a user to select tracks for playback, fast-forward and rewind, see track listings and track lengths, see elapsed time, control volume, pause, play, and the like. FIG. 1 depicts an example of a typical user interface 100 for CD player software for operation on a conventional personal computer. Interface 100 includes controls 101 for operating the player, as well as a display area 102 for displaying information such as album and track information, elapsed time, and the like.

Users are also increasingly turning to their computers to listen to music that is provided via the Internet. Music may be downloaded or streamed onto the user's computer (freely or for a fee) for playback via media player software, either in the context of an online radio station, peer-to-peer media sharing scheme, e-commerce site, or the like. Such music may be provided in any of a number of formats, including for example MP3, WAV, and the like. In all these environments, which are well known in the art, users listen to music via a player software program. As with CD player software, such a program may contain controls for controlling playback, viewing information about the music being played, and the like.

It is known to vary the appearance of the user interface for audio player software in any of a number of ways. For many interfaces, users may adjust color, font, and size preferences for various components via a "preferences" or "options" dialog box that may be implemented by the software application or by the operating system. The appearance of the interface may further be personalized by installing any of a variety of "skins" that provide a collection of artistic or fanciful backgrounds, icons, and other elements. Such skins are available and downloadable from companies such as Team Sonique, a division of Lycos Inc. of Waltham, Mass. FIG. 2 depicts an example of a skin 200 for a user interface for playback of music on a conventional personal computer. Controls 201 are given an appearance that matches the overall style and color scheme of skin 200.

In general, current techniques for personalizing and customizing a user interface for an audio player offer a wide variety of options, but are usually dependent on user action to effect changes. Such techniques typically retain a particular "look" or set of customization preferences until the user explicitly indicates that he or she would like to change the settings. In particular, such techniques generally fail to change the appearance of the interface in response to the particular content being played. Thus, where the user is playing a variety of different types of music, the customization preferences may not suit at least some of the music as it is being played.

In addition, current techniques fail to provide the user with a mechanism for changing the appearance of user interface elements that are external to the music player application itself. Thus, any customization preferences are limited to the area of the screen associated with the music player interface itself, and do not affect other portions of the screen. In particular, current customization techniques fail to provide functionality for changing such external elements in response to content being played by the music player application.

Finally, current techniques fail to provide a content-related environment that includes interactive interface features customized to the content being played in the music player application, and in particular such techniques fail to provide such an environment that extends beyond the area of the screen associated with the music player interface itself.

SUMMARY OF THE INVENTION

The present invention provides a content-related environment, including wallpaper (such as background imagery) and/or interactive features, while music or other content is being played. The invention may be embodied in any content playback system, including but not limited to a media player such as an audio player software application or a video player software application. The content may come from any source, including CD-ROM, DVD-ROM, hard drive, and the like, or a network connection for providing streamed or downloaded content, for example via the Internet.

The invention provides the capability for easily and automatically integrating album cover art or other content-related imagery and/or interactive features into the user's desktop or other background area of the screen while a media player is playing content. The presentation of the content-related imagery and/or interactive features is not limited to the area of the screen associated with the media player, but can extend to other areas of the screen as well, including those controlled by the operating system or by other applications. The display of the content-related imagery and/or interactive features can be temporary, so that the display reverts to its original state after the content piece is completed. The content-related imagery and/or interactive features can change automatically as new tracks are played, if desired. For example, the invention may display an image of an album cover related to a song being played; when the song is over, the display changes to show another image, or it reverts to its previous state.

The content-related imagery and/or interactive features may be displayed, for example, as desktop wallpaper, so that it appears as a background to other user interface elements such as icons and windows. The content-related imagery may be album cover art or any other art or images related to the media content being played. The content-related imagery may, for example, match album cover art that is displayed in a window associated with the media player. Alternatively, it may include other images, text, song lyrics, and the like. Such imagery may be provided via a file stored on the user's computer or on a CD or other, storage medium, or it may be downloaded via a network such as the Internet. The media content being played may include tags that identify the location of the items to be displayed, or it may contain the items themselves.

In one aspect, the invention displays an interactive interface providing functionality related to media content being played. The interface may be displayed in addition to or instead of content-related imagery, and may operate to change the behavior of the user's desktop or background. For example, in addition to displaying album art related to media content being played, the invention may provide an interface for purchasing CDs or tickets to special events, or accessing a database of tour information. Such an interface may be implemented, for example using an Active Desktop function as provided in the Microsoft Windows operating system. By displaying content-related interactive functionality in this manner, the invention provides a content-related interactive environment that extends beyond the bounds of the media player application itself.

The invention may be implemented in a CD player, MP3 player, streaming audio or video player, or any other content playback device or software application. Customization features are provided for altering the appearance and presentation of the content-related imagery and/or interactive features.

By providing content-related wallpaper or other content-related displays and/or interfaces that can extend beyond the media player itself, the invention allows the user to experience their music or other content more fully by immersing him or her more fully in the experience.

Figure 1:
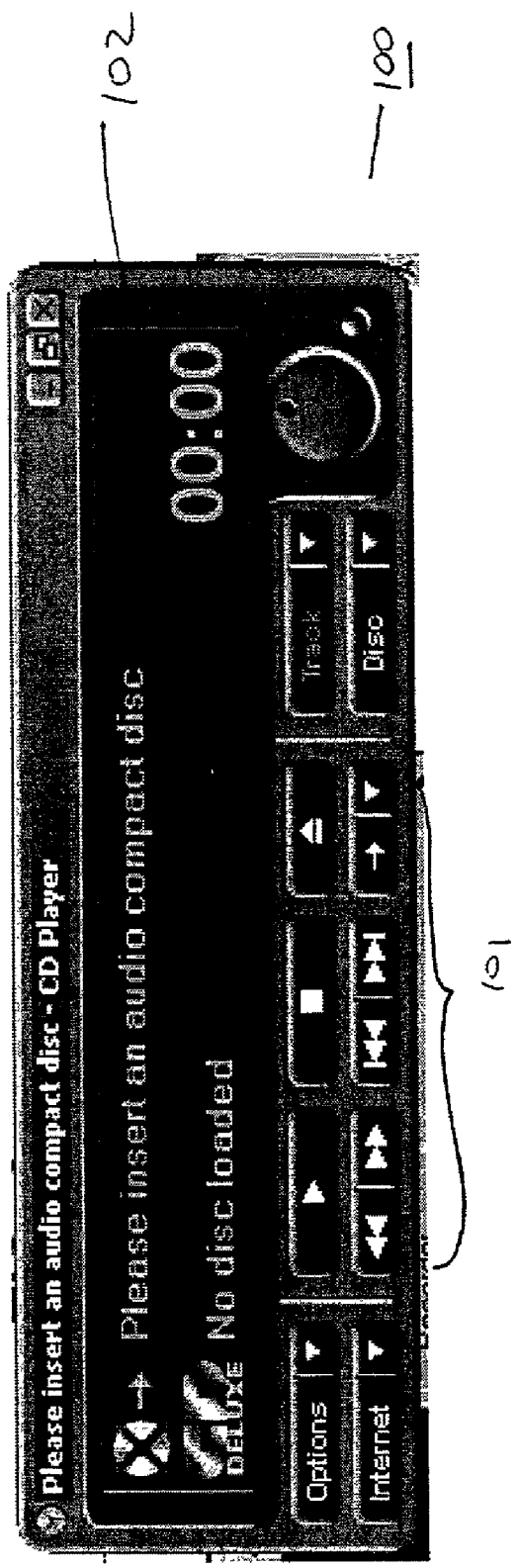
FIG. 1 is an example of a music player interface according to the prior art.
Figure 2:
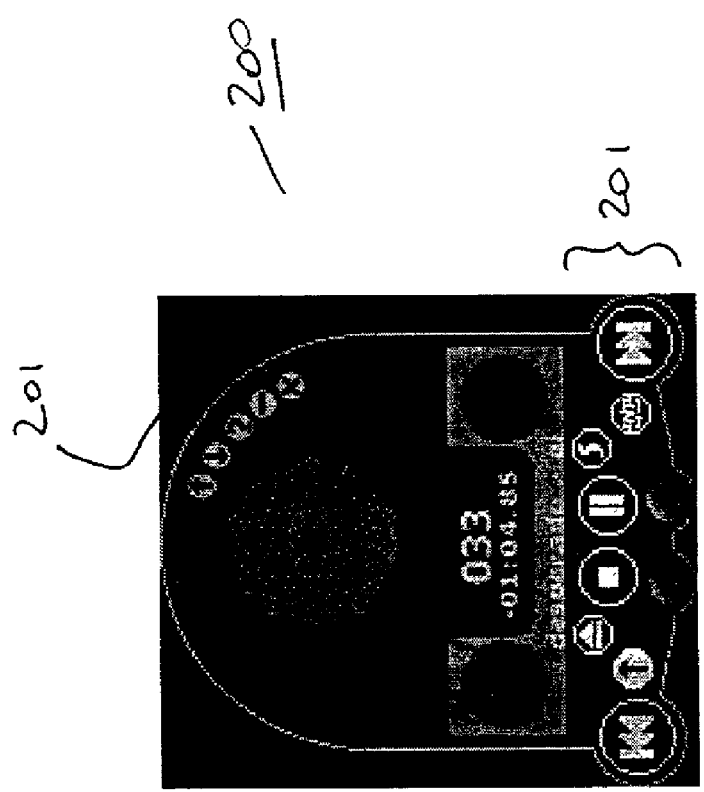
FIG. 2 is an example of a skin for a music player interface according to the prior art.

The figures depict a preferred embodiment of the present invention for purposes of illustration only. One skilled in the art will readily recognize from the following discussion that alternative embodiments of the structures and methods illustrated herein may be employed without departing from the principles of the invention.

DETAILED DESCRIPTION OF THE PREFERRED EMBODIMENTS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Furthermore, for illustrative purposes the following description of the invention refers to a media player for playing audio content such as music. However, one skilled in the art will recognize that the content-related wallpaper of the present invention can be provided in conjunction with any type of content, including for example video, text, speech, and the like. Accordingly, the invention is not intended to be limited to any particular type of content or media player.

The present invention provides functionality for displaying wallpaper that is related to and/or synchronized with content being played by a media player such as a music jukebox on a personal computer. For example, when a song is playing for which content-related imagery is available, that imagery is presented as wallpaper or desktop background, in the operating system. When content-related imagery is not available, a default image (such as a product logo) is presented as wallpaper. When no song is playing, default artwork is used as the background, or the system reverts to the user's ordinary desktop settings.

Figure 9:
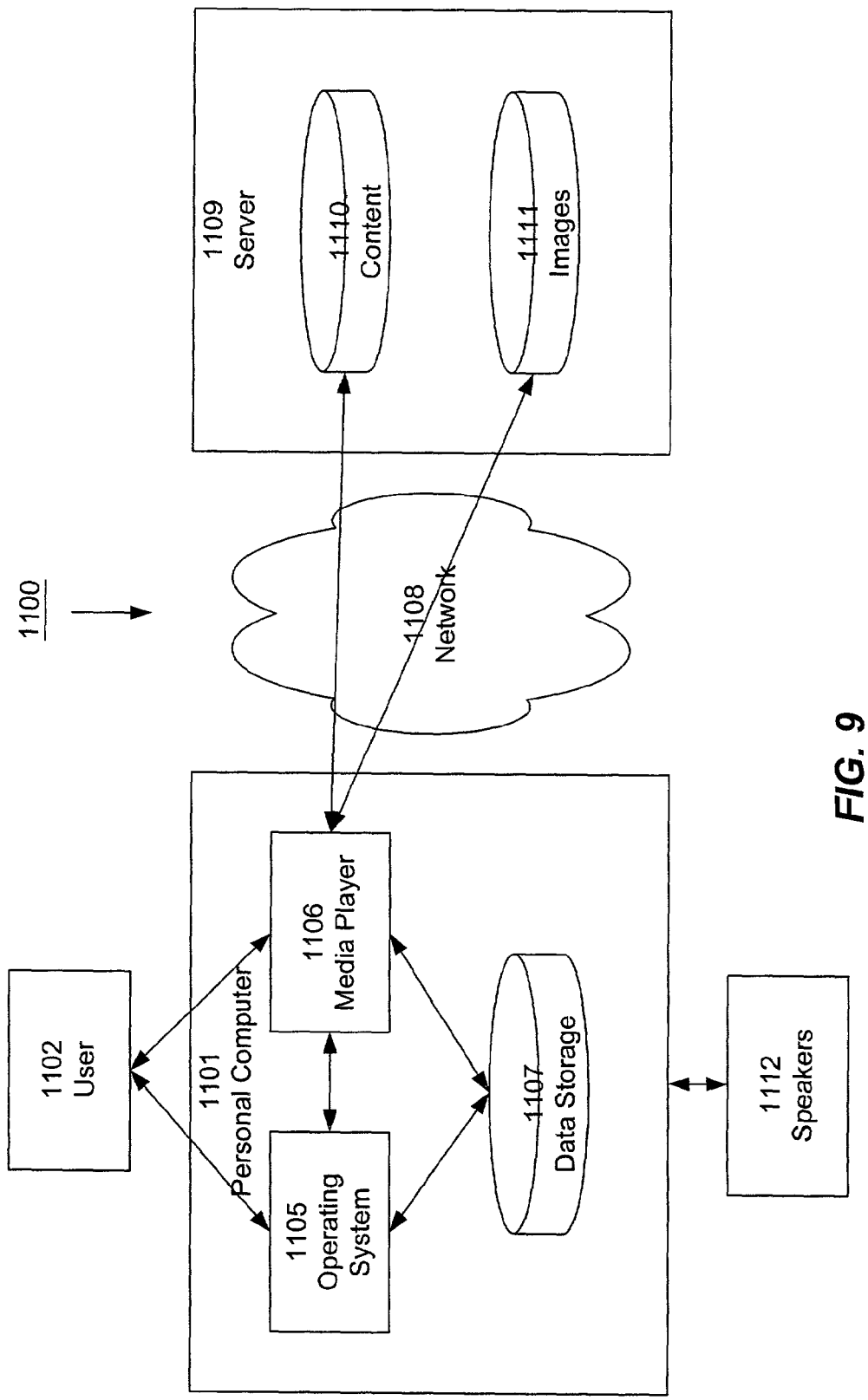
FIG. 9 is a block diagram depicting a system for implementing the invention according to one embodiment.

Referring now to FIG. 9, there is shown an example of a system 1100 for practicing the present invention according to one embodiment. In one embodiment, the invention operates in conjunction with media player 1106 such as a personal jukebox, CD player, DVD player, or the like for digital music and/or video. Such an application operates as software for personal computer (PC) 1101, which is a conventional personal computer. PC 1101 runs operating system 1105, which may be a conventional operating system such as Microsoft Windows, available from Microsoft Corporation of Redmond, Wash. Data storage 1107, which may be a conventional hard drive or other form of digital storage, stores content files and imagery to be output by media player 1106. User 1102 interacts with operating system 1105, media player 1106, and other components of PC 1101 via input/output devices (not shown) that are conventional and well known in the art, including for example, a display screen, keyboard, mouse, and the like. Media player 1106 may be implemented as a standalone application, or as a component of an application such as a browser, or as a plug-in for an application such as a browser.

As is known in the art, media player 1106 offers functionality for, for example, recording, downloading, organizing and playing music and/or video on PC 1101 and listen to it through speakers 1112 connected to PC 1101. PC 1101 can also be connected to other output devices, such as a stereo system and/or television set (not shown) for improved audio and/or video quality. As is known in the art, media player 1106 may allow users to record and play digital music in various formats, including for example MP3, Windows Media Audio (WMA), WAV, and CD audio formats. Similar functionality may be provided for video as well.

In one embodiment, PC 1101 is connected to network 1108 such as the Internet, according to techniques that are well known in the art. For example, PC 1101 may communication with network 1108 using TCP/IP or other well-known network protocols, and may be connected to network 1108 via a telephone modem, cable modem, digital subscriber line (DSL), or the like. Server 1109 responds to media player 1106 requests for content by retrieving content from content data storage 1110 and providing it to media player 1106 via network 1108. As described in more detail below, server 1109 also retrieves images from image storage 1111 and provides it to media player 1106 via network 1108. In an alternative embodiment, content storage 1110 and image storage 1111 may be provided on separate servers and/or at different locations. In yet another embodiment, the invention may operate without a connection to network 1108 and without server 1109; in such an embodiment, media player 1106 may obtain content and images from some other source, such as a CD, DVD, hard drive, or the like, which may be internal to or external to PC 1101. In yet another embodiment, other types of content-related resources, including interactive features and applications, web sites, URLs, and the like, may be provided in addition to or instead of images. Such resources may be provided by server 1109 or by other sources via network 1108. For example, the invention may retrieve content-related web pages for display in an Active Desktop environment; such web pages may be identified by tags in the content, but may be retrieved from any source whether in server 1109 or in some other network-attached server.

Included in the media player 1106 are several features that retrieve additional information from network 1108 and server 1109. Media player 1106 can request a variety of information from the server 1109, including, for example, information describing the music currently being played, recommendations for other music, or even custom-programmed radio stations. In one embodiment, the information exchange for each of these features is accomplished by the use of HTTP requests to server 1109 (or to other servers) via network 1108.

Examples of features that may be provided in connection with media player 1106 include, for example:

Now Playing: Displays information about content currently being played, such as album and artist information.

Guide: Links to a large music-oriented website that can supply the user with extended information about artists such as biographies, discographies, and related artists. May be viewable via a browser, so that activating the Guide starts up the browser, or may be presented directly from within media player 1106.

Personalized Radio: Streams personalized music to user 1102, according to individual musical tastes.

Figure 10:
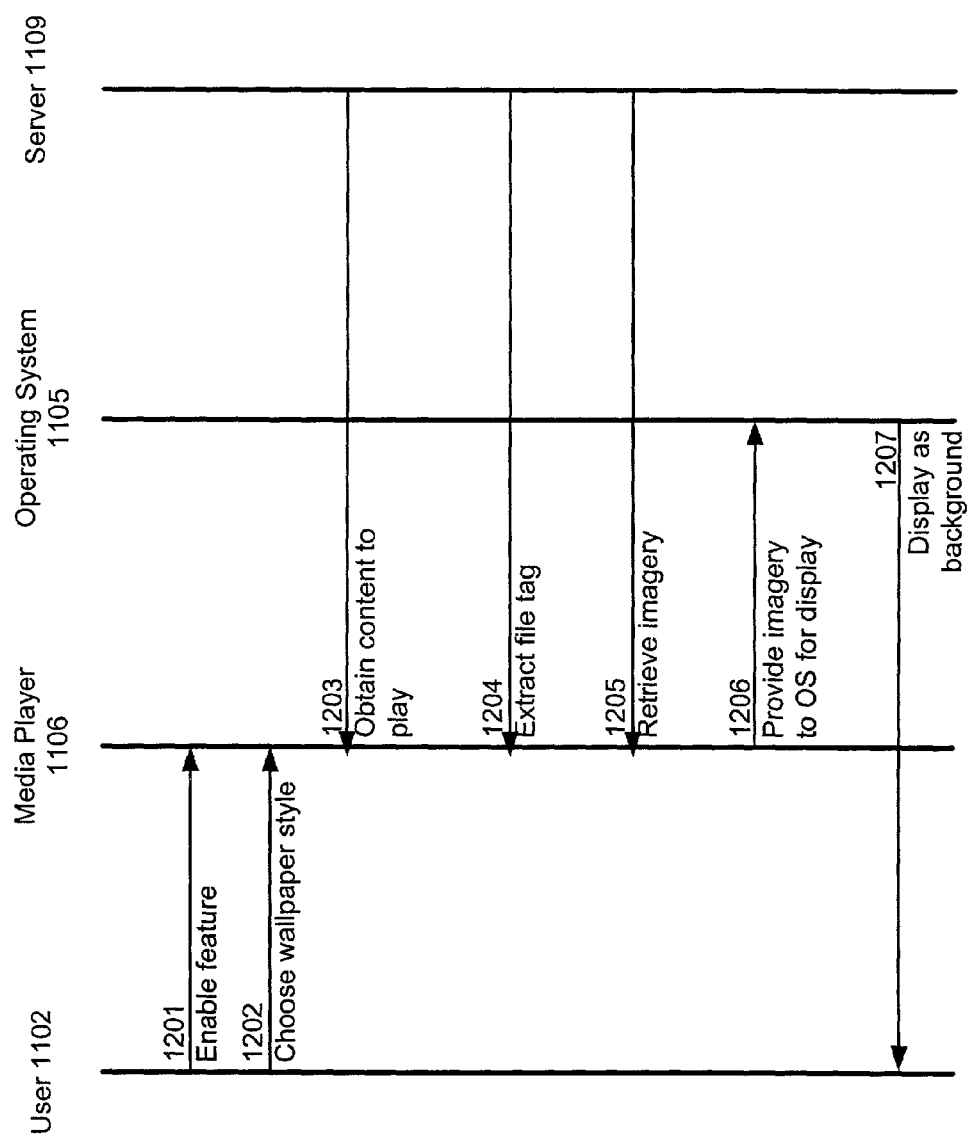
FIG. 10 is an event diagram depicting a method of activating content-related wallpaper according to one embodiment.

Referring now to FIG. 10, there is shown an event diagram depicting a method of activating content-related wallpaper according to one embodiment of the present invention. In one embodiment, content-related wallpaper is an optional feature of media player 1106, and by default is turned off until enabled by the user. The user enables 1201 the content-related wallpaper display by activating the appropriate command in media player 1106. In one embodiment, the wallpaper display is configurable and may be turned on or off by the user as desired.

In one embodiment, the user's original desktop settings are saved, either in memory or on disk (for example, in data storage 1107), so that they can later be restored. Original settings (including static wallpaper images and display settings) are restored when, for example, media player 1106 exits or is terminated, or when the content-related wallpaper feature is turned off by the user.

Figure 3:
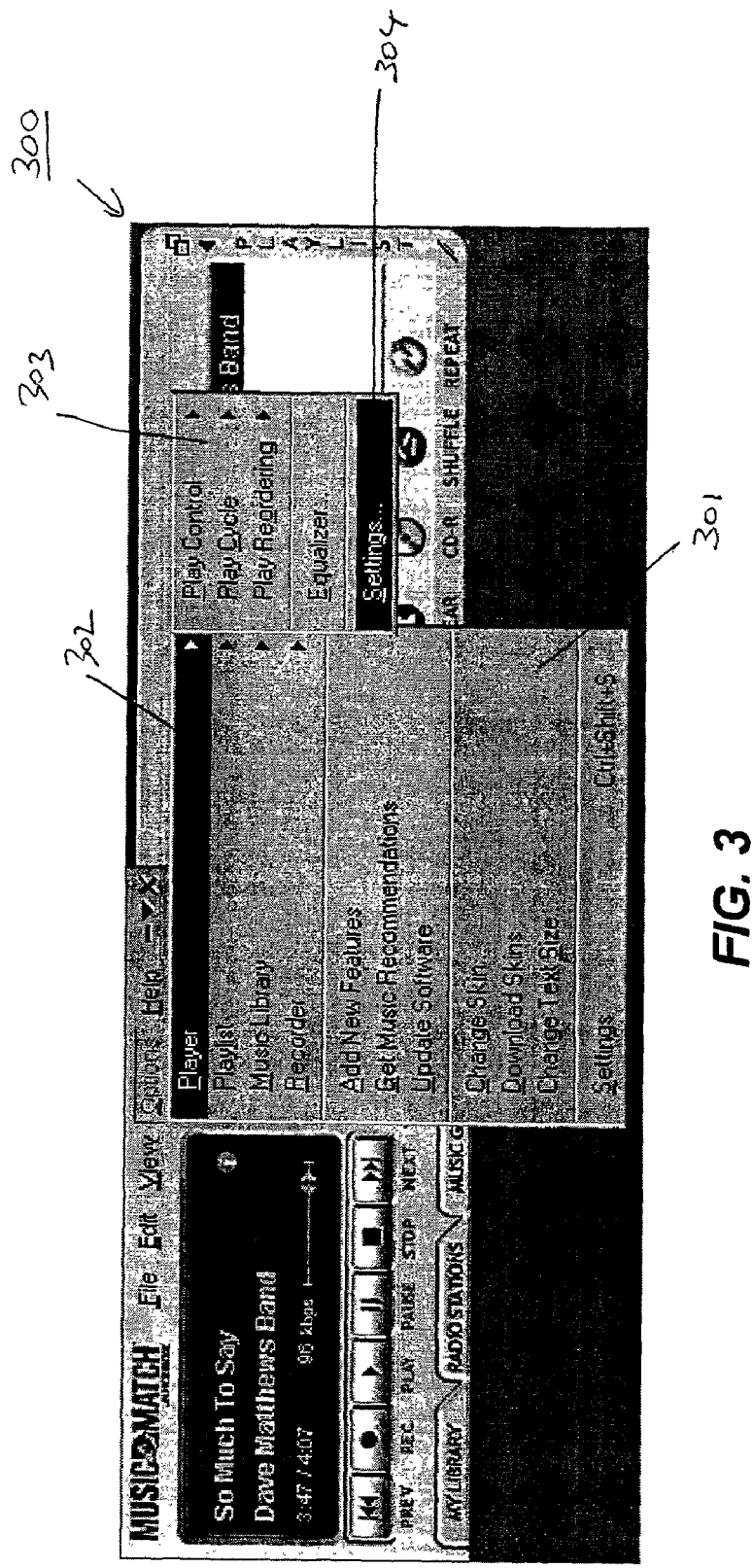
FIG. 3 is a screen shot showing a settings menu item for a music player interface according to one embodiment.

Referring also to FIG. 3, there is shown an example of a media player interface 300 including settings menu item 304 for accessing settings for activating and configuring content-related wallpaper according to one embodiment. In the example of FIG. 3, interface 300 includes options menu 301. Player command 302 in options menu 301 activates player submenu 303, which contains settings command 304.

Figure 4:
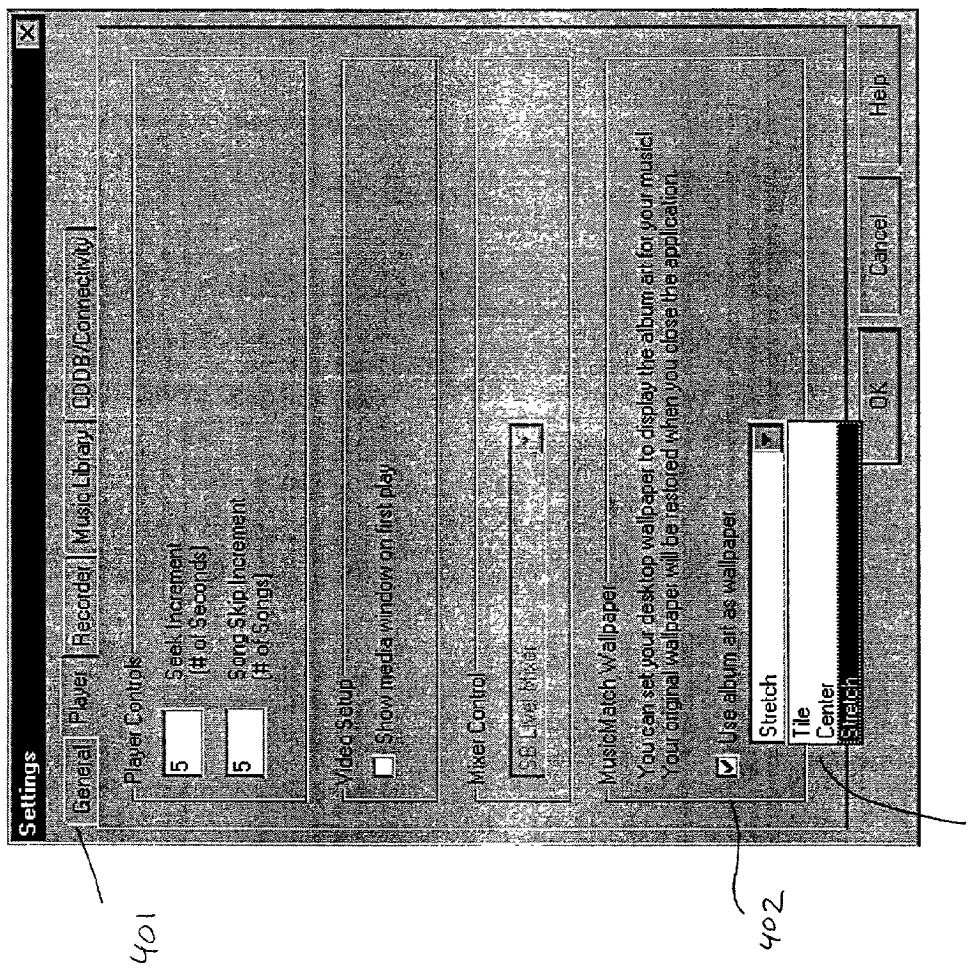
FIG. 4 is a screen shot showing a settings dialog box, with the wallpaper option activated, for a music player interface according to one embodiment.

Referring also to FIG. 4, there is shown an example of a settings dialog box 400, as may be activated by settings command 304 of FIG. 3. Dialog box 400 includes several tabs 401 for accessing various categories of settings. The illustration shows the player tab 401 activated, which contains preferences and options applicable to the player itself. The user may check or uncheck box 402 to indicate whether the content-related wallpaper feature is to be activated. Menu 403 provides several options for controlling the display of content-related wallpaper, including a tile option (wherein the image is repeated across the screen in a series of tiles), a center option (wherein the image is centered on the screen), and a stretch option (wherein the image is scaled to fit the screen). One skilled in the art will recognize that other options and customizable parameters may be presented for specifying how content-related images should be displayed, and that the options presented in the example of FIG. 4 are merely exemplary. For example, options may be presented for altering the color, size, displayed area, and the like, as well as for applying special effects such as blur, rotate, skew, and the like. Additional options may be provided for the display of interactive content, such as in an Active Desktop display, for example.

Referring again to FIG. 10, once the user has enabled 1201 the content-related wallpaper display (via, for example, checkbox 402), he or she chooses 1202 a style for the wallpaper. The user may select among various parameters for the display of the wallpaper, including for example those provided in menu 403. If the user does not select a style, a default style may be automatically selected.

Media player 1106 retrieves 1203 content to be played. Step 1203 may be performed in response to an explicit request by the user to play content (such as by the user activating a "play" button on screen 300), or according to an automated mechanism for selecting and playing content (for example, in the context of a personalized radio station that selects music according to a user's tastes). In one embodiment, player 1106 retrieves 1203 content from server 1109 via network 1108. Content may be provided in downloadable or streamed format, according to techniques that are well known in the art such as, for example, web-based radio functionality. In another embodiment, player 1106 obtains content from local data storage 1107 such as a hard drive or CD.

Media player 1106 extracts 1204 a file tag specifying a location of imagery related to the content being played, and retrieves 1205 the imagery. Imagery may contain, for example, album art related to music being played by player 1106. In one embodiment, the file tag is imbedded in the content itself. File tags may contain any type of information about the content being played, including for example artist name, album title, track title, track number, a pointer to album art, and the like. Such information may be stored in the content file itself in binary form. Accordingly, a pointer to album art or other imagery to be used for content-related wallpaper can be extracted from the appropriate file tag. The file tag may specify the location of the image using any known file locator scheme, such as for example a Uniform Resource Locator (URL), Internet Protocol (IP) address, or the like. Imagery is retrieved 1205 by any conventional technique for requesting and receiving data, such as for example a GET request. If the imagery is located in local data storage 1107 on user's personal computer 1101, it may be retrieved by accessing the storage device in a conventional manner. In one embodiment, the retrieved tag specifies a network-based location; in another embodiment, the retrieved tag specifies a location on the user's PC 1101. In yet another embodiment, imagery is specified via an ID3v2 tag as is known in the art for an MP3 image format.

In another embodiment, the file tag specifies the location of interactive features, documents, or other functionality such as a website. The interactive features are retrieved 1205 by any conventional technique for requesting and receiving data, such as for example a GET request.

In another embodiment, data representing the image itself (or the interactive features) is imbedded in the content being played. The data may be provided in any known image format, including for example a compressed or uncompressed bitmap, JPEG file, GIF file, or the like.

In another embodiment, several file tags or images are imbedded, so that the wallpaper can change from one image to another during playback of the content. For example, a first image or tag may be imbedded at the beginning of a song, and a second image or tag may be imbedded at a later point in the song; accordingly a first image would be displayed for the first portion of the song and a second image would be displayed for the second portion of the song. Time codes may be associated with the imbedded images or tags, to specify when images should switch. In another embodiment, a series of images or tags may be imbedded, and the wallpaper may rotate among the images specified in the series, according to a frequency that may be predefined or specified by an imbedded tag.

In one embodiment, if no image is available or if the image is missing, corrupted, or unspecified, a default image (such as a product logo) may be used. The default image may be stored in advance on data storage 1107, or it may be made available from server 1109 via network 1108, either in advance or on an as-needed basis.

Whichever technique is used for obtaining the content-related imagery, in one embodiment it is temporarily stored in data storage 1107, for example in a bitmap format, and provided 1206 to operating system 1105 for display 1207 as wallpaper. If any special effects are to be applied, such as blur, rotate, and the like, these effects are applied according to techniques known in the art before the imagery is stored. In one embodiment, media player 1106 makes a call to the operating system to specify the location of the file containing the imagery, and to specify what style should be used to show the file, as specified in 1202. In an embodiment using Microsoft Windows, if the Active Desktop is enabled, this call is made through the Active Desktop instead of directly to Windows. Such calls to the Windows operating system and/or the Active Desktop are known in the art. In one embodiment, the operating system makes calls to other applications running on the computer, so that content-related imagery is presented in areas of the screen controlled by the other applications as well.

In one embodiment, the imagery is displayed within the user interface of media player 1106, in addition to or lieu of displaying the imagery as a background on the user's desktop. The user may specify whether the imagery is to be displayed in the user interface, or on the desktop, or both, as desired.

Figure 5:
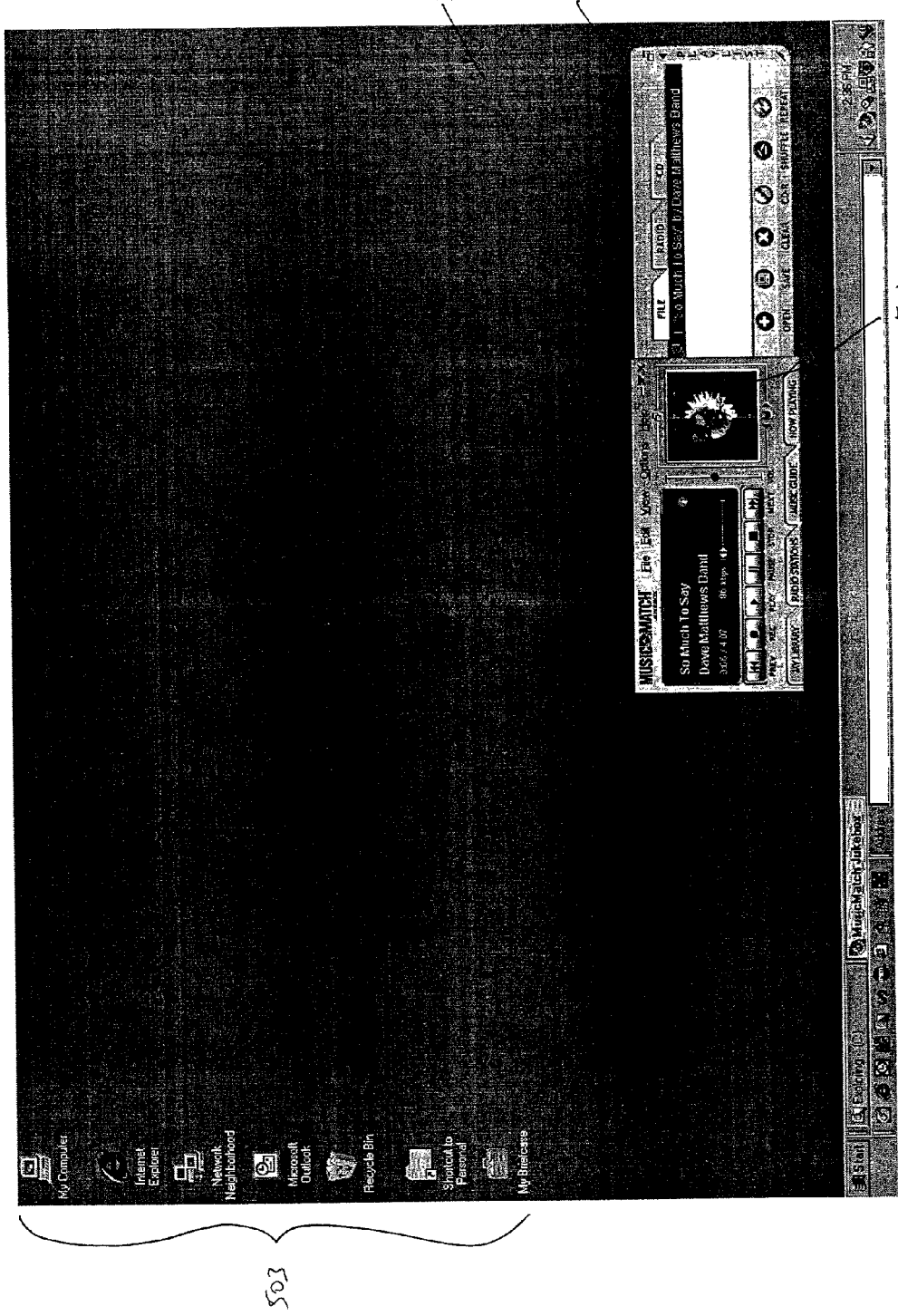
FIG. 5 is a screen shot showing a plain desktop background without wallpaper.

The imagery is displayed 1207 according to the user-selected settings, and may be presented as background wallpaper. If interactive features are displayed 1207, they may be presented in a background context, such as via an Active Desktop environment. Referring now to FIGS. 5 through 8 and 11, there are shown various examples of displaying content-related wallpaper and interactive features according to user-selected settings. FIG. 5 shows an example where desktop 502 is plain and does not contain content-related wallpaper, but media player interface 300 contains window 501 that displays the content-related imagery. Such a screen may be presented, for example, when the user deactivates the content-related wallpaper feature by unchecking box 402 in dialog box 400.

Figure 6:
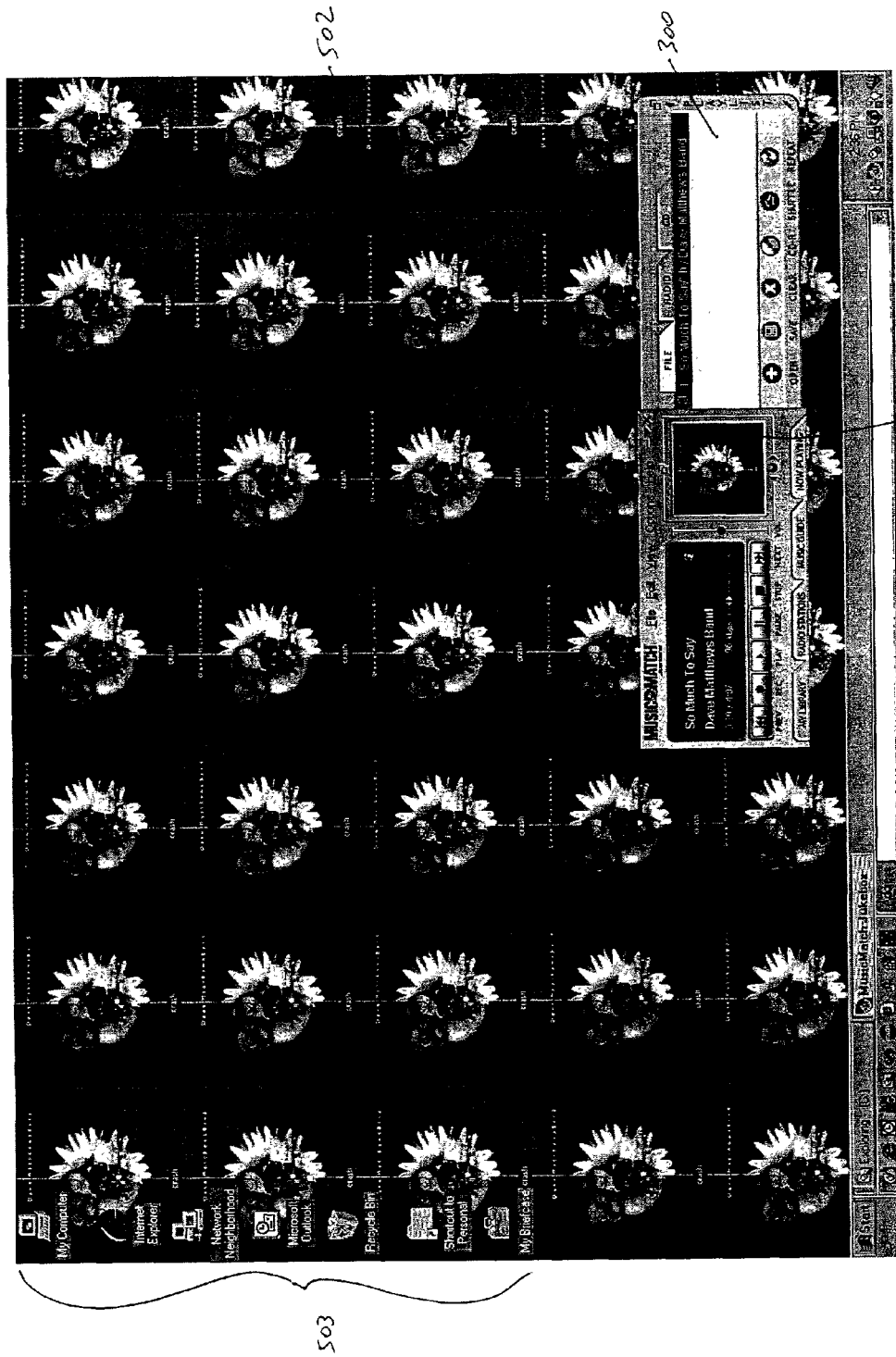
FIG. 6 is a screen shot showing a background containing tiled content-related wallpaper according to one embodiment.

FIG. 6 depicts an example where desktop 502 shows tiled content-related imagery, and media player interface 300 contains window 501 that also displays the content-related imagery. Icons 503 are superimposed on the tiled content-related imagery, in a manner known in the art for displaying wallpaper as a desktop background. Such a screen may be presented, for example, when the user activates the content-related wallpaper feature by checking box 402, and selects the tile option in menu 403 of dialog box 400.

Figure 7:
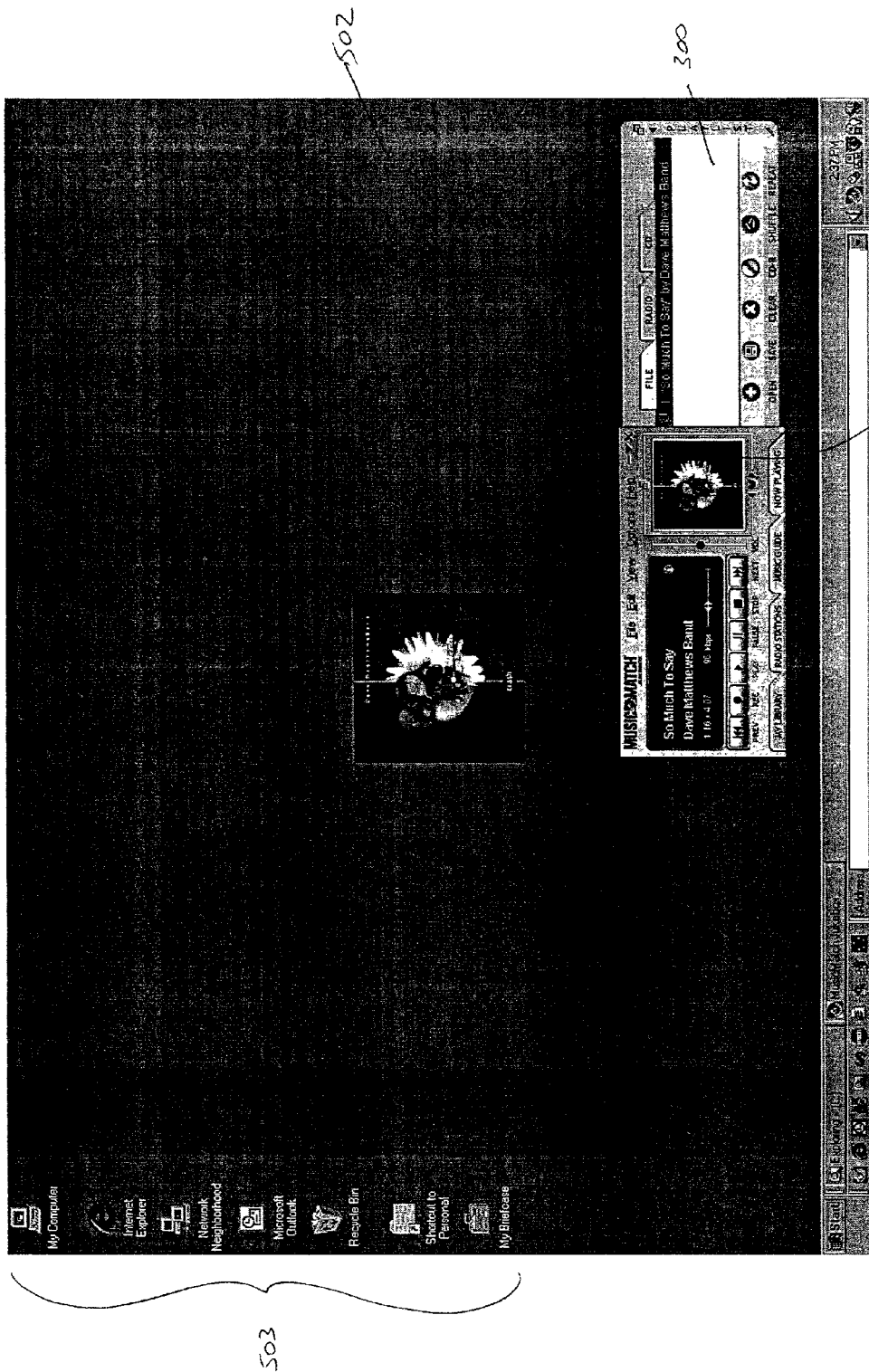
FIG. 7 is a screen shot showing a background containing centered content-related wallpaper according to one embodiment.

FIG. 7 depicts an example where desktop 502 shows centered content-related imagery, and media player interface 300 contains window 501 that also displays the content-related imagery. Icons 503 are superimposed on the centered content-related imagery, in a manner known in the art for displaying wallpaper as a desktop background. Such a screen may be presented, for example, when the user activates the content-related wallpaper feature by checking box 402, and selects the center option in menu 403 of dialog box 400.

Figure 8:
FIG. 8 is a screen shot showing a background containing stretched content-related wallpaper according to one embodiment.

FIG. 8 depicts an example where desktop 502 shows content-related imagery that has been scaled to fit the screen, and media player interface 300 contains window 501 that also displays the content-related imagery. Icons 503 are superimposed on the stretched content-related imagery, in a manner known in the art for displaying wallpaper as a desktop background. Such a screen may be presented, for example, when the user activates the content-related wallpaper feature by checking box 402, and selects the stretch option in menu 403 of dialog box 400.

One skilled in the art will recognize that the imagery can be provided to other applications and/or operating system components instead of or in addition to the wallpaper display shown in the examples of FIGS. 5 through 8. Thus, the imagery may be used as the basis for other display elements on the screen of PC 1101. For example, the color scheme of the imagery may be used for configuring other user interface elements. Alternatively, the imagery may be used as a background bitmap for user interface components in other applications or in operating system 1105. These various implementations allow content-related wallpaper, such as album art, to be seamlessly and effortlessly integrated into the user's desktop and other user interface components, so as to provide an improved user experience when playing content such as music.

In addition, the present invention can, in one embodiment, present interactive features that are related to content being played on media player 1106. Active Desktop functionality, as implemented in the Microsoft Windows operating system, provides the capability for displaying interactive content, such as web pages, in the background area of the user's desktop. In one embodiment of the present invention, the Active Desktop is configured to display, in the background area, web pages and/or other interactive interfaces related to the content being played on media player 1106. As described above in connection with content-related imagery, such content-related interactive interfaces can be specified using media tags imbedded within content being played. For example, tags imbedded in musical content may identify web pages for selling CDs or concert tickets related to the musical content; the Active Desktop functionality can then be used to display the web pages.

Figure 11:
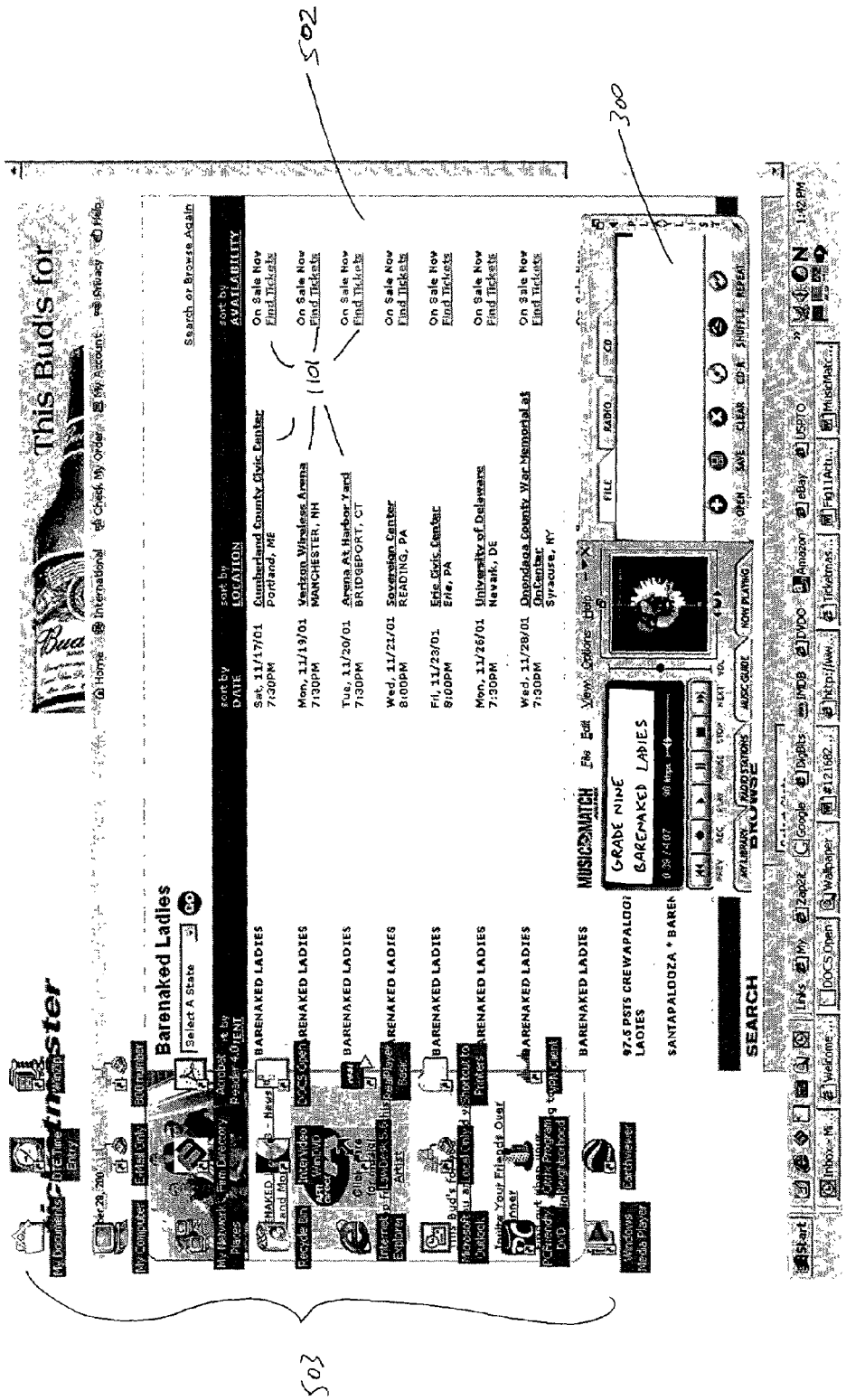
FIG. 11 is a screen shot showing a background containing a content-related interactive interface background according to one embodiment.

Referring now to FIG. 11, there is shown an example where desktop 501 shows a web page with which the user can interact, according to Active Desktop techniques that are known in the art. The particular web page being displayed is determined based on the content being played on media player 1106. For example, a URL embedded in content received by media player 1106 identifies a ticket-purchasing website; the URL is provided to the Active Desktop functionality of the operating system so that the corresponding website can be displayed in desktop 501. Media player interface 300 is shown, along with icons 503 superimposed on the content-related interface. The user may click on links 1101 in the Active Desktop background to view related web pages, to purchase CDs or tickets, and to perform other actions in connection with the web page being displayed. In one embodiment, when a new track is played in media player 1106, the contents of desktop 501 change so as to display another web page having information and links related to content being played.

One skilled in the art will recognize that other techniques may be used for providing a content-related interactive environment. Components such as Active Desktop backgrounds and the like may implement any functionality that can be provided by the user's computer system, in conjunction with attached peripherals and network-connected resources, and that may be triggered by or related to content being played.

In one embodiment, if media player interface 300 is minimized, content-related wallpaper and/or interactive features are still displayed. In another embodiment, if media player interface 300 is minimized, content-related wallpaper/or interactive features are not displayed.

One skilled in the art will recognize that the steps shown in FIG. 10 need not be performed in any particular order. For example, a user might enable the content-related wallpaper feature after content has begun to play. Also, one skilled in the art will recognize that not all the steps shown in FIG. 10 are essential to the invention; for example, the step of choosing 1202 a wallpaper style may be omitted, in which case a predefined wallpaper style may be used, or a wallpaper style may be automatically selected based on the characteristics of the imagery and the screen size.

As will be understood by those familiar with the art, the invention may be embodied in other specific forms without departing from the spirit or essential characteristics thereof. For example, the particular architectures depicted above are merely exemplary of one implementation of the present invention. Many other applications, variations, and implementations of the invention will be apparent to one skilled in the art. Wallpaper and other backgrounds may be applied to particular windows and application elements, instead of or in addition to the desktop itself. In addition, wallpaper artwork may be related to and/or synchronized with other types of content, such as documents, text, web pages, video files, audio files, game play, and the like. Additional options, such as particular colors, distortions, image combinations, and the like, for the particular display of background images may be provided. Wallpaper may contain animations or other special features that are related to the content being displayed or played. Images may also contain advertising material, if desired.

Accordingly, the functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

What is claimed is:

1. A computer-implemented method for displaying a content-related element, comprising: receiving, in a media player having an interface displayed in a window in an onscreen display area, content containing at least one tag; retrieving at least one element identified by the at least one tag; playing, in the media player, the received content, the received content being content selected for play by the media player; and issuing at least one resource call to display the retrieved at least one element in a display area that extends beyond the media player display area, such that the window containing the media player's interface appears to be superimposed on the display area that displays the retrieved at least one element as wallpaper, the at least one element is displayed as wallpaper while the received content is the content selected for play by the media player, wherein the displayed at least one element comprises at least one interactive element.

2. The method of claim 1, wherein issuing at least one resource call comprises issuing at least one resource call to display the retrieved at least one element in a background area of a display screen.

3. The method of claim 1, wherein the at least one element comprises at least one image.

4. The method of claim 1, wherein the at least one element comprises at least one interactive interface screen.

5. The method of claim 1, wherein the at least one element comprises at least one web page.

6. A system for displaying a content-related element, comprising: a media player for receiving content containing at least one tag and for playing the received content, the media player having an interface displayed in a window in an onscreen display area, the received content being content selected for play by the media player; an element retriever, coupled to the media player, for retrieving at least one element identified by the at least one tag; an operating system interface, coupled to the element retriever, for issuing at least one resource call to display the retrieved at least one element in a display area that extends beyond the media player display area, such that the window containing the media player's interface appears to be superimposed on the display area that displays the retrieved at least one element as wallpaper, the at least one element is displayed as wallpaper while the received content is the content selected for play by the media player, wherein the displayed at least one element comprises at least one interactive element.

7. The system of claim 6, wherein the operating system interface issues at least one resource call to display the retrieved at least one element in a background area of a display screen.

8. The system of claim 6, wherein the at least one element comprises at least one image.

9. The system of claim 6, wherein the at least one element comprises at least one interactive interface screen.

10. The system of claim 6, wherein the at least one element comprises at least one web page.

11. A computer program product for displaying a content-related element, comprising: a computer readable medium; and computer program code, encoded on the medium, for controlling a processor to perform the operations of: receiving, in a media player having an interface displayed in a window in an onscreen display area, content containing at least one tag; retrieving at least one element identified by the at least one tag; playing, in the media player, the received content, the received content being content selected for play by the media player; and issuing at least one resource call to display the retrieved at least one element in a display area that extends beyond the media player display area, such that the window containing the media player's interface appears to be superimposed on the display area that displays the retrieved at least one element as wallpaper, the at least one element is displayed as wallpaper while the received content is the content selected for play by the media player, wherein the displayed at least one element comprises at least one interactive element.

12. The computer program product of claim 11, wherein the computer-program code for controlling a processor to perform the operation of issuing at least one resource call comprises computer-program code for controlling a processor to perform the operation of issuing at least one resource call to display the retrieved at least one element in a background area of a display screen.

13. The computer program product of claim 11, wherein the at least one element comprises at least one image.

14. The computer program product of claim 11, wherein the at least one element comprises at least one interactive interface screen.

15. The computer program product of claim 11, wherein the at least one element comprises at least one web page.

16. The method of claim 1, wherein receiving content containing at least one tag comprises retrieving the content from a first storage medium.

17. The method of claim 16, wherein retrieving at least one element identified by the at least one tag comprises retrieving the at least one element from the first storage medium.

18. The method of claim 16, wherein retrieving at least one element identified by the at least one tag comprises retrieving the at least one element from a second storage medium.

19. The method of claim 16, wherein retrieving at least one element identified by the at least one tag comprises receiving the at least one element across a network connection.

20. The method of claim 1, wherein receiving content containing at least one tag comprises receiving the content across a network connection.

21. The method of claim 20, wherein retrieving at least one element identified by the at least one tag comprises retrieving the at least one element from a storage medium.

22. The method of claim 20, wherein retrieving at least one element identified by the at least one tag comprises receiving the at least one element across the network connection.

23. The method of claim 1, wherein the retrieved at least one element comprises at least one image.

24. The method of claim 1, wherein the retrieved at least one element is related to the received content.

25. The method of claim 1, wherein the received content comprises music, and wherein playing the received content comprises outputting the music.

26. The method of claim 1, wherein issuing at least one resource call comprises issuing at least one resource call to display the retrieved at least one element as an active desktop element.

27. The method of claim 1, further comprising: receiving input indicating user interaction with the at least one interactive element.

28. The method of claim 1, wherein issuing at least one resource call comprises issuing at least one resource call to display the at least one element as a background image.

29. The method of claim 1, wherein issuing at least one resource call comprises issuing at least one resource call to display the at least one element as wallpaper for a virtual desktop.

30. The method of claim 1, wherein issuing at least one resource call comprises issuing at least one resource call to display the at least one element as a background for a user interface element.

31. The method of claim 30, wherein the user interface element comprises an onscreen window.

32. The method of claim 1, further comprising: upon completion of playing of the received content, issuing at least one resource call to remove the displayed at least one element from the display area.

33. The method of claim 1, further comprising: upon completion of playing of the received content, issuing at least one resource call to cause the display area displaying the retrieved at least one element to revert to a previous state.

34. The method of claim 1, further comprising: receiving user input specifying at least one parameter for displaying a content-related element; wherein issuing at least one resource call comprises issuing at least one resource call to display the retrieved at least one element according to the specified at least one parameter.

35. The method of claim 1, wherein the received content comprises at least a first section and a second section, further comprising: retrieving at least a second element using the at least one tag contained in the content; and responsive to the media player beginning to play the second section and the second section of the received content being the content selected for play by the media player, issuing at least one resource call to display the retrieved second element in the area that extends beyond the media player display area, such that the window containing the media player's display interface appears to be superimposed on the display area that displays the retrieved second element as wallpaper, the retrieved second element is displayed as wallpaper while the second section of the received content is the content selected for play by the media player.

36. The method of claim 1, further comprising: receiving, in the media player, additional content containing at least one tag; retrieving at least a second element identified by the at least one tag contained in the additional content; playing, in the media player, the received additional content, the received additional content being the content selected for play by the media player; and issuing at least one resource call to display the retrieved second element in the display area that extends beyond the media player display area, such that the window containing the media player's display interface appears to be superimposed on the display area that displays the retrieved second element as wallpaper, the retrieved second element is displayed as wallpaper while the received additional content is the content that is selected for play by the media player.

37. The method of claim 1, further comprising: caching the retrieved at least one element; and wherein retrieving at least one identified element comprises: responsive to the at least one identified element having been previously cached, retrieving the at least one identified element from the cache.

38. The method of claim 1, wherein: retrieving at least one element comprises retrieving at least a plurality of elements; and issuing at least one resource call comprises: selecting an element from the retrieved plurality of elements; and issuing at least one resource call to display the selected element in the display area that extends beyond the media player display area, such that the window containing the media player's display interface appears to be superimposed on the display area that displays the retrieved at least one element, the selected element is displayed as wallpaper while the received content is the content selected for play by the media player.

39. The method of claim 38, wherein selecting an element comprises selecting an element at random.

40. The method of claim 38, wherein the plurality of elements are organized in a sequence, and wherein selecting an element comprises selecting an element according to the sequence.

41. The method of claim 1, wherein issuing at least one resource call comprises issuing at least one resource call to display the retrieved at least one element in a portion of the display area of the media player.

42. The method of claim 1, further comprising: issuing at least one resource call to display at least one user interface element according to a color scheme derived from the at least one retrieved element.

43. The system of claim 6, further comprising: a first storage medium, communicatively coupled to the media player, for storing the content; wherein the media player receives the content from the first storage medium.

44. The system of claim 43, wherein the element retriever retrieves the at least one element from the first storage medium.

45. The system of claim 43, wherein the element retriever comprises a network interface for receiving the at least one element across a network.

46. The system of claim 6, further comprising: a network interface, coupled to the media player, for receiving the content across a network.

47. The system of claim 46, wherein the network interface receives the at least one element across the network.

48. The system of claim 6, wherein the retrieved at least one element comprises at least one image.

49. The system of claim 6, wherein the retrieved at least one element is related to the received content.

50. The system of claim 6, wherein the received content comprises music, and wherein playing the received content comprises outputting the music.

51. The system of claim 6, further comprising a display, coupled to the operating system interface, for displaying the retrieved at least one element in the display area that extends beyond the media player display area.

52. The system of claim 6, wherein operating system interface issues at least one resource call to display the retrieved at least one element as an active desktop element.

53. The system of claim 6, further comprising: an input device, coupled to the operating system interface, for receiving input indicating user interaction with the at least one interactive element.

54. The system of claim 6, wherein the operating system interface issues at least one resource call to display the at least one element as a background image.

55. The system of claim 6, wherein the operating system interface issues at least one resource call to display the at least one element as wallpaper for a virtual desktop.

56. The system of claim 6, wherein the operating system interface issues at least one resource call to display the at least one element as a background for a user interface element.

57. The system of claim 56, wherein the user interface element comprises an onscreen window.

58. The system of claim 6, wherein, upon completion of the media player playing of the received content, the operating system interface issues at least one resource call to remove the displayed at least one element from the display area that extends beyond the media display area.

59. The system of claim 6, wherein, upon completion of the media player playing of the received content, the operating system interface issues at least one resource call to cause the display area that extends beyond the media display area to revert to a previous state.

60. The system of claim 6, further comprising: a user input device, coupled to the operating system interface, for receiving user input specifying at least one parameter for displaying a content-related element; wherein the operating system interface issues at least one resource call to display the retrieved at least one element according to the specified at least one parameter.

61. The system of claim 6, wherein the received content comprises at least a first section and a second section, and wherein: the element retriever retrieves at least a second element using the at least one tag contained in the content; and responsive to the media player beginning to play the second section and the second section being the content selected for play by the media player, the operating system interface issues at least one resource call to display the retrieved second element in the area that extends beyond the media player display area, such that the window containing the media player's display interface appears to be superimposed on the display area that displays the retrieved second element as wallpaper, the retrieved second element is displayed as wallpaper while the second section of the retrieved content is the content selected for play by the media player.

62. The system of claim 6, wherein: the media player receives additional content containing at least one tag and plays the received additional content, the received additional content being the content selected for play by the media player; the element retriever retrieves at least a second element identified by the at least one tag contained in the additional content; and the operating system interface issues at least one resource call to display the retrieved second element in the display area that extends beyond the media player display area, such that the window containing the media player's display interface appears to be superimposed on the display area that displays the retrieved second element as wallpaper, the retrieved second element is displayed as wallpaper while the received additional content is the content selected for play by the media player.

63. The system of claim 6, further comprising: a cache, coupled to the element retriever, for caching the retrieved at least one element; and wherein, responsive to the at least one identified element having been previously cached, the element retriever retrieves the at least one identified element from the cache.

64. The system of claim 6, wherein: the element retriever retrieves at least one element comprises retrieving at least a plurality of elements; and the media player selects an element from the retrieved plurality of elements; and the operating system interface issues at least one resource call to display the selected element in the display area that extends beyond the media player display area, such that the window containing the media player's display interface appears to be superimposed on the display area that displays the selected element, the selected element is displayed as wallpaper while the received content is the content selected for play by the media player.

65. The system of claim 64, wherein the media player selects the element at random.

66. The system of claim 64, wherein the plurality of elements are organized in a sequence, and wherein the media player selects the element according to the sequence.

67. The system of claim 6, wherein the operating system interface issues at least one resource call to display the retrieved at least one element in a portion of the onscreen display area of the media player.

68. The system of claim 6, wherein operating system interface issues at least one resource call to display at least one user interface element according to a color scheme derived from the at least one retrieved element.

69. The computer program product of claim 11, wherein the computer program code for receiving content containing at least one tag comprises computer program code for retrieving the content from a first storage medium.

70. The computer program product of claim 69, wherein the computer program code for retrieving at least one element identified by the at least one tag comprises computer program code for retrieving the at least one element from the first storage medium.

71. The computer program product of claim 69, wherein computer program code for retrieving at least one element identified by the at least one tag comprises computer program code for retrieving the at least one element from a second storage medium.

72. The computer program product of claim 69, wherein the computer program code for retrieving at least one element identified by the at least one tag comprises computer program code for receiving the at least one element across a network connection.

73. The computer program product of claim 11, wherein the computer program code for receiving content containing at least one tag comprises computer program code for receiving the content across a network connection.

74. The computer program product of claim 73, wherein the computer program code for retrieving at least one element identified by the at least one tag comprises computer program code for retrieving the at least one element from a storage medium.

75. The computer program product of claim 73, wherein the computer program code for retrieving at least one element identified by the at least one tag comprises computer program code for receiving the at least one element across the network connection.

76. The computer program product of claim 11, wherein the retrieved at least one element comprises at least one image.

77. The computer program product of claim 11, wherein the retrieved at least one element is related to the received content.

78. The computer program product of claim 11, wherein the received content comprises music, and wherein the computer program code for playing the received content comprises computer program code for outputting the music.

79. The computer program product of claim 11, wherein the computer program code for issuing at least one resource call comprises computer program code for issuing at least one resource call to display the retrieved at least one element as an active desktop element.

80. The computer program product of claim 11, further comprising computer program code, encoded on the medium, for controlling a processor to perform the operation of: receiving input indicating user interaction with the at least one interactive element.

81. The computer program product of claim 11, wherein the computer program code for issuing at least one resource call comprises computer program code for issuing at least one resource call to display the at least one element as a background image.

82. The computer program product of claim 11, wherein the computer program code for issuing at least one resource call comprises computer program code for issuing at least one resource call to display the at least one element as wallpaper for a virtual desktop.

83. The computer program product of claim 11, wherein the computer program code for issuing at least one resource call comprises computer program code for issuing at least one resource call to display the at least one element as a background for a user interface element.

84. The computer program product of claim 83, wherein the user interface element comprises an onscreen window.

85. The computer program product of claim 11, further comprising computer program code, encoded on the medium, for controlling a processor to perform the operation of: upon completion of playing of the received content, issuing at least one resource call to remove the displayed at least one element from the display area that extends beyond the media player display area.

86. The computer program product of claim 11, further comprising computer program code, encoded on the medium, for controlling a processor to perform the operation of: upon completion of playing of the received content, issuing at least one resource call to cause the display area that extends beyond the media player display area to revert to a previous state.

87. The computer program product of claim 11, further comprising computer program code, encoded on the medium, for controlling a processor to perform the operation of: receiving user input specifying at least one parameter for displaying a content-related element; and wherein the computer program code for issuing at least one resource call comprises computer program code for issuing at least one resource call to display the retrieved at least one element according to the specified at least one parameter.

88. The computer program product of claim 11, wherein the received content comprises at least a first section and a second section, further comprising computer program code, encoded on the medium, for controlling a processor to perform the operations of: retrieving at least a second element using the at least one tag contained in the content; and responsive to the media player beginning to play the second section and the second section of the received content being the content selected for play by the media player, issuing at least one resource call to display the retrieved second element in the display area that extends beyond the media player display area, such that the window containing the media player's display interface appears to be superimposed on the display area that displays the second element as wallpaper, the retrieved second element is displayed as wallpaper while the second section of the received content is the content selected for play by the media player.

89. The computer program product of claim 11, further comprising computer program code, encoded on the medium, for controlling a processor to perform the operations of: receiving, in the media player, additional content containing at least one tag; retrieving at least a second element identified by the at least one tag contained in the additional content; playing, in the media player, the received additional content, the received additional content being the content selected for play by the media player; and issuing at least one resource call to display the retrieved second element in the display area that extends beyond the media player display area, such that the window containing the media player's display interface appears to be superimposed on the display area that displays the retrieved second element as wallpaper, the retrieved second element is displayed as wallpaper while the received additional content is the content selected for play by the media player.

90. The computer program product of claim 11, further comprising computer program code, encoded on the medium, for controlling a processor to perform the operation of: caching the retrieved at least one element; and wherein the computer program code for retrieving at least one identified element comprises: computer program code for, responsive to the at least one identified element having been previously cached, retrieving the at least one identified element from the cache.

91. The computer program product of claim 11, wherein: the computer program code for retrieving at least one element comprises computer program code for retrieving at least a plurality of elements; and the computer program code for issuing at least one resource call comprises computer program code for: selecting an element from the retrieved plurality of elements; and issuing at least one resource call to display the selected element in the display area that extends beyond the media player display area, such that the window containing the media player's display interface appears to be superimposed on the display area that displays the selected element, the selected element is displayed as wallpaper while the received content is the content selected for play by the media player.

92. The computer program product of claim 91, wherein the computer program code for selecting an element comprises computer program code for selecting an element at random.

93. The computer program product of claim 91, wherein the plurality of elements are organized in a sequence, and wherein the computer program code for selecting an element comprises computer program code for selecting an element according to the sequence.

94. The computer program product of claim 11, wherein the computer program code for issuing at least one resource call comprises computer program code for issuing at least one resource call to display the retrieved at least one element in a portion of the display area of the media player.

95. The computer program product of claim 11, further comprising computer program code, encoded on the medium, for controlling a processor to perform the operation of: issuing at least one resource call to display at least one user interface element according to a color scheme derived from the at least one retrieved element.

\* \* \* \* \*